United States Patent
Chang (10) Patent No.: US 10,001,887 B2
(45) Date of Patent: Jun. 19, 2018

(54) MULTI-TOUCH TOUCH SCREEN AND ITS JUNCTION AREA TOUCH SENSING METHOD

(71) Applicant: eGalax_eMPIA Technology Inc., Taipei (TW)

(72) Inventor: Chin-Fu Chang, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 4 days.

(21) Appl. No.: 14/586,006

(22) Filed: Dec. 30, 2014

(65) Prior Publication Data

US 2015/0185924 A1 Jul. 2, 2015

(30) Foreign Application Priority Data

Dec. 31, 2013 (TW) .............................. 102149346 A (51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 2203/04104* (2013.01)

(58) Field of Classification Search
CPC .................. G06F 3/044; G06F 3/0416; G06F 2203/04104; G06F 2203/04808

USPC ........................................... 345/174, 1.1, 1.2
See application file for complete search history.

(56) References Cited

U.S. PATENT DOCUMENTS

| 8,669,955 B2* | 3/2014 | Nishio | G06F 3/04886 345/1.1 |
| 2011/0084927 A1* | 4/2011 | Chang | G06F 3/0416 345/173 |
| 2012/0075245 A1* | 3/2012 | Chang | G06F 3/0416 345/174 |

\* cited by examiner

*Primary Examiner* — Lisa Landis
(74) *Attorney, Agent, or Firm* — Muncy, Geissler, Olds & Lowe, P.C.

(57) ABSTRACT

A multi-touch touch screen and its junction area touch sensing method are disclosed. The multi-touch touch screen consists of multiple touch screens each including a touch-sensing device having a touch-sensing layer for sensing the present of one or multiple points and generating a respective sensing information and a controller for computing the center or centroid of each sensing information and the distance between the centers or centroids of each two sensing information and then comparing each computed distance with a predetermined reference distance and then determining the contact to be a multi-point of contact if the computed distance is larger than the predetermined reference value, or a single-point of contact if the computed distance is smaller than the predetermined reference value.

16 Claims, 9 Drawing Sheets

MULTI-TOUCH TOUCH SCREEN AND ITS JUNCTION AREA TOUCH SENSING METHOD

This application claims the priority benefit of Taiwan patent application number 102149346, filed on Dec. 31, 2013.

BACKGROUND OF THE INVENTION

1. Field of the Invention

The present invention relates to touch control technology and more particularly, to a multi-touch touch screen and a junction area touch sensing method for use in the multi-touch touch screen to accurately recognize each touch control to be a single point of contact or multi-point of contact, reducing the chance of error and false action and enhancing the use convenience.

2. Description of the Related Art

Touch display has been widely used in a variety of electronic devices. The common technique is to mount a touch sensing panel on a touch display for providing a two-dimensional touch area. By means of scanning the longitudinal axis and transverse axis of the surface of the touch sensing panel, the presence or approach of one or more than two points of contact of one or multiple external objects (for example, finger or fingers) with the surface is recognized.

A sensing information can be converted by an analog-to-digital converter (ADC) into a plurality of continuous signal values. Subject to the variation of these signal values before and after the presence of an external object, the touching or approaching location of the external object at the touch sensing panel is determined.

Due to cost or technical problem, or the constraint of the structure or dimension of the electronic device, the size of the display is limited. The size of the display area affects the size of the picture content and users viewing distance. For example, in an outdoor public place, it needs to install a super large display for enabling people to view the video clearly at a long distance. For use in a mobile phone convenient for carrying, the size of the display must be small (such as 3.5 inch or 4 inch). However, the screen of a mobile phone is too small and not easy to watch, and can make the user's eyes feel uncomfortable. However, current super large display manufacturing techniques still cannot achieve the standard for cheap mass production. Thus, super large displays are still very expensive. If a mobile phone is equipped with a large display (such as 4.3 inch, 4.7 inch or 5.5 inch), it will bring the problem of being Inconvenient to pick up and carry.

In order to solve the aforesaid problems, TV walls, multi-display mobile phones and notebook computers are created. With the development of touch control techniques, touch displays have become more and more commonplace. Almost all the advanced electronic devices are equipped with a touch display. Further, multiple touch displays may be arranged together to form a big multi-touch touch display. However, the picture displayed on a multi-touch is a continuous picture. When operating a multi-touch touch display that is formed of an array of touch displays, the user may touch the junction area between two touch displays. If the user touches the junction area between two touch displays with a finger, the contact of the finger with the surface of the multi-touch touch display will be divided by the junction area into two touch areas that are respectively located on the two touch displays. Because these two touch displays respectively recognize the presence of a point of touch, this single point of contact can be erroneously determined to be a two points of contact, causing the electronic device to generate an error instruction and to further make an error follow-up processing. Thus, the user can get an unsmooth operation problem and needs to make many other touch control actions. This is a big problem that needs to be solved.

SUMMARY OF THE INVENTION

The present invention has been accomplished under the circumstances in view. It is therefore the main object of the present invention to provide a multi-touch touch screen and its junction area touch sensing method that is cable of accurately recognizing a touch at a junction area between multiple touch screens of the multi-touch touch screen subject to the function of a touch-sensing layer of a touch-sensing device of each individual touch screen to sense the presence of at least one point of contact of at least one external object with the surface thereof and to generate a corresponding sensing information, and the function of a controller to compute the center or centroid of each sensing information and the distance between the centers or centroids of each two sensing information respectively obtained from two adjacent touch screens at the same time and then to compare each computed distance with a predetermined reference distance, and then to determine the contact to be a multi-point of contact if the computed distance is larger than the predetermined reference value, or a single-point of contact if the computed distance is smaller than the predetermined reference value.

Further, each produced sensing information can be a signal value, a difference between signal values, or a double difference between signal values.

Further, the center of each sensing information can be the geometric center or center point (the value of the center position) of the associating touch area.

Further, the centroid of each sensing information can be the center of gravity of the associating touch area, or the weighted average position.

Further, the predetermined reference distance value is larger than or equal to the gap distance of the junction area.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
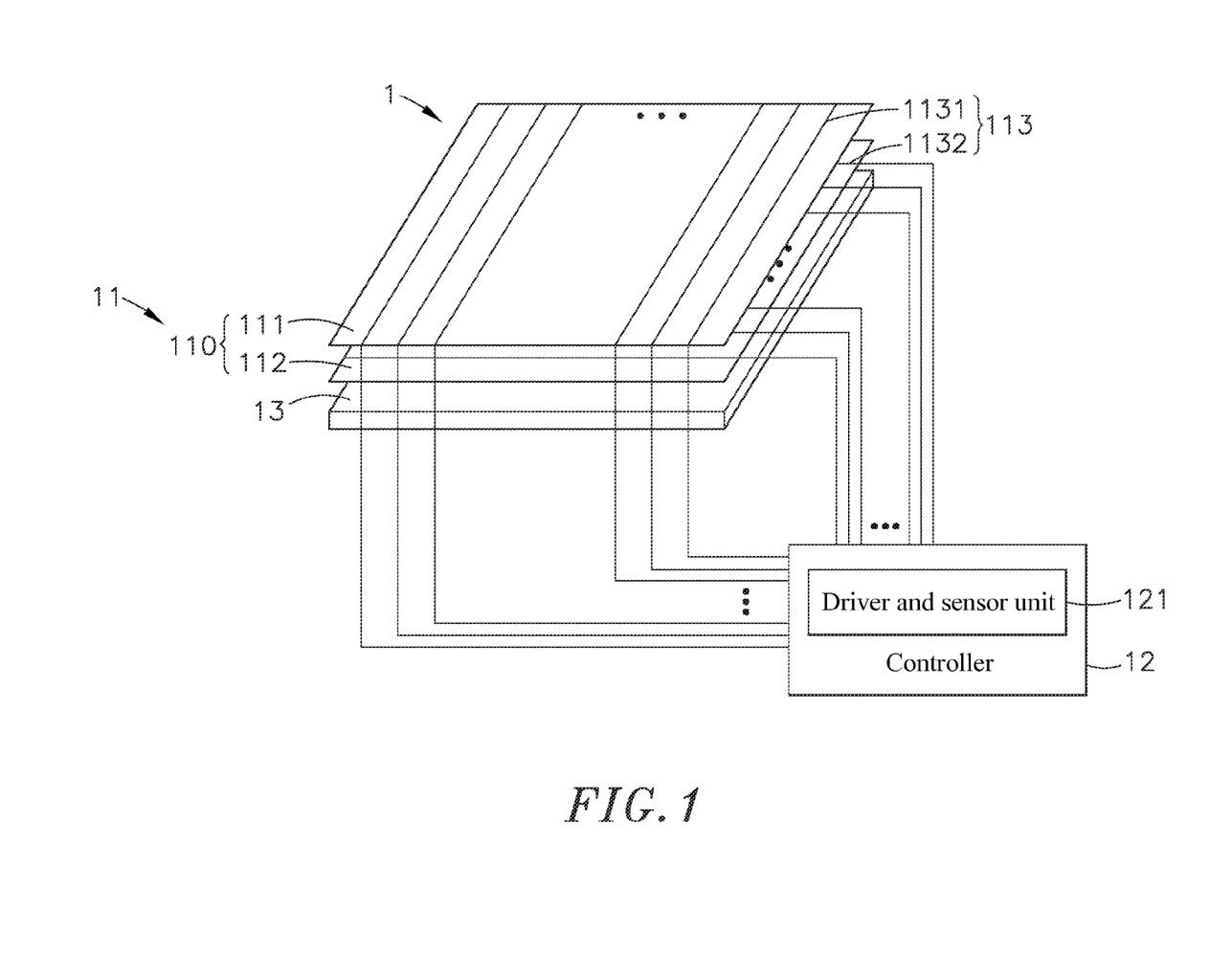
FIG. 1 is a schematic structural view of a touch screen for multi-touch touch screen in accordance with the present invention.
Figure 2:
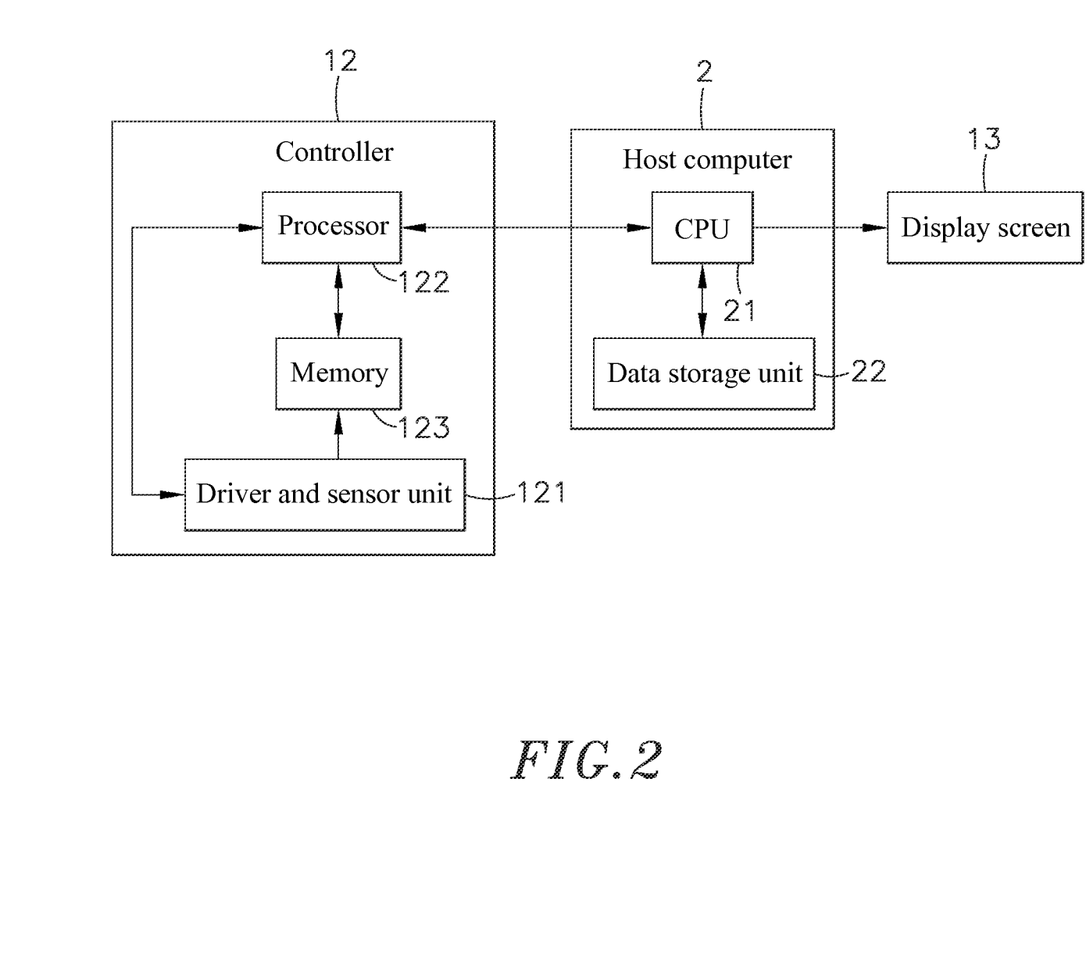
FIG. 2 is a circuit block diagram of the controller and display screen of the multi-touch touch screen and the related host computer in accordance with the present invention.
Figure 3:
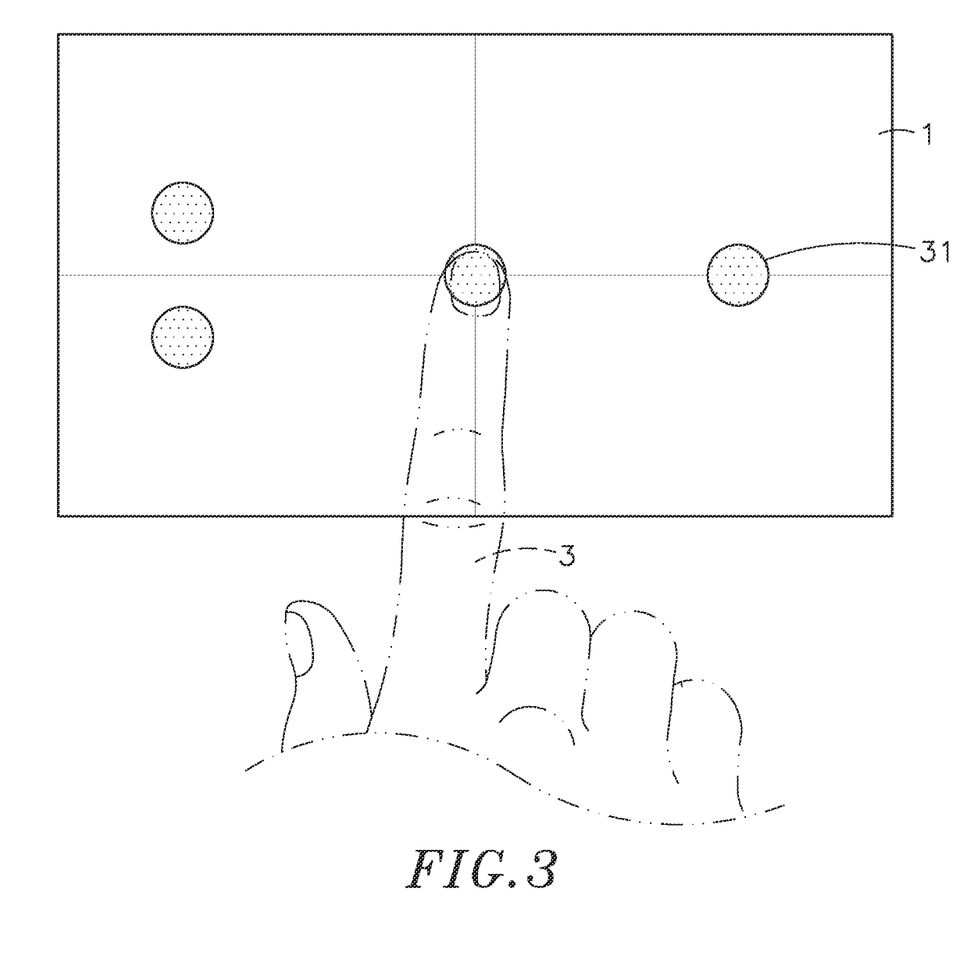
FIG. 3 is a schematic top view illustrating a touch operation of the multi-touch touch screen in accordance with the present invention.

Referring to FIGS. 1, 2 and 3, a touch screen 1 in accordance with the present invention is shown. As illustrated, the touch screen 1 comprises a display screen 13, a touch-sensing device 11 arranged on the display screen 13, and a controller 12 electrically coupled with the touch-sensing device 11. The touch-sensing device 11 comprises a touch-sensing layer 110 that comprises a first sensing layer 111 and a second sensing layer 112 arranged in a stack, and a plurality of sensors 113 including first sensors 1131 arranged on the first sensing layer 111 and second sensors 1132 arranged on the second sensing layer 112 to cross over the first sensors 1131 at the first sensing layer 111. Further, a shielding layer (not shown) can be selectively arranged between the touch-sensing device 11 and the display screen 13. The controller 12 comprises a driver and sensor unit 121 electrically operatively coupled with the touch-sensing device 11, a processor 122 adapted for controlling the driver and sensor unit 121 to generate a sensing information, and a memory 123 accessible by the processor 122 for storing sensing signals generated by the driver and sensor unit 121. The touch screen 1 is used with a host computer 2 that comprises a CPU 21 electrically coupled with the display screen 13, and a data storage unit 22 accessible by the CPU 21. In an alternate form of the present invention, the first sensors 1131 and the second sensors 1132 are arranged in the touch-sensing layer 110 in a coplanar manner. The driver and sensor unit 121 generates a sensing information subject to signals from the sensors 113. For example, in self-capacitive sensing, it senses the sensors 113 that have been driven; in mutual-capacitive sensing, it senses the sensors 113 that are not being directly driven by the driver and sensor unit 121.

Figure 6:
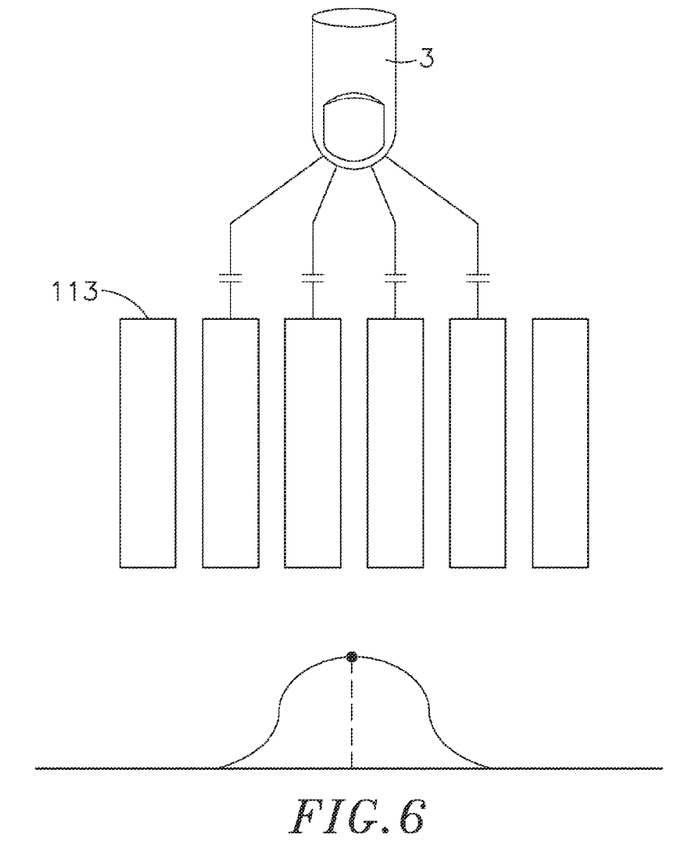
FIG. 6 is a schematic drawing illustrating the configuration of a signal value in accordance with the present invention.

When an external object (for example, finger 3) touches or approaches the touch-sensing device 11 of the touch screen 1, the sensing information of the sensors 113 in one axis (for example, X-axis) is converted into a signal value illustrated in FIG. 6. The signal value exhibits a waveform or finger profile corresponding to the contour of the finger. In a single touch application, the peak of the finger profile is the location of the touch or approaching point.

Figure 4:
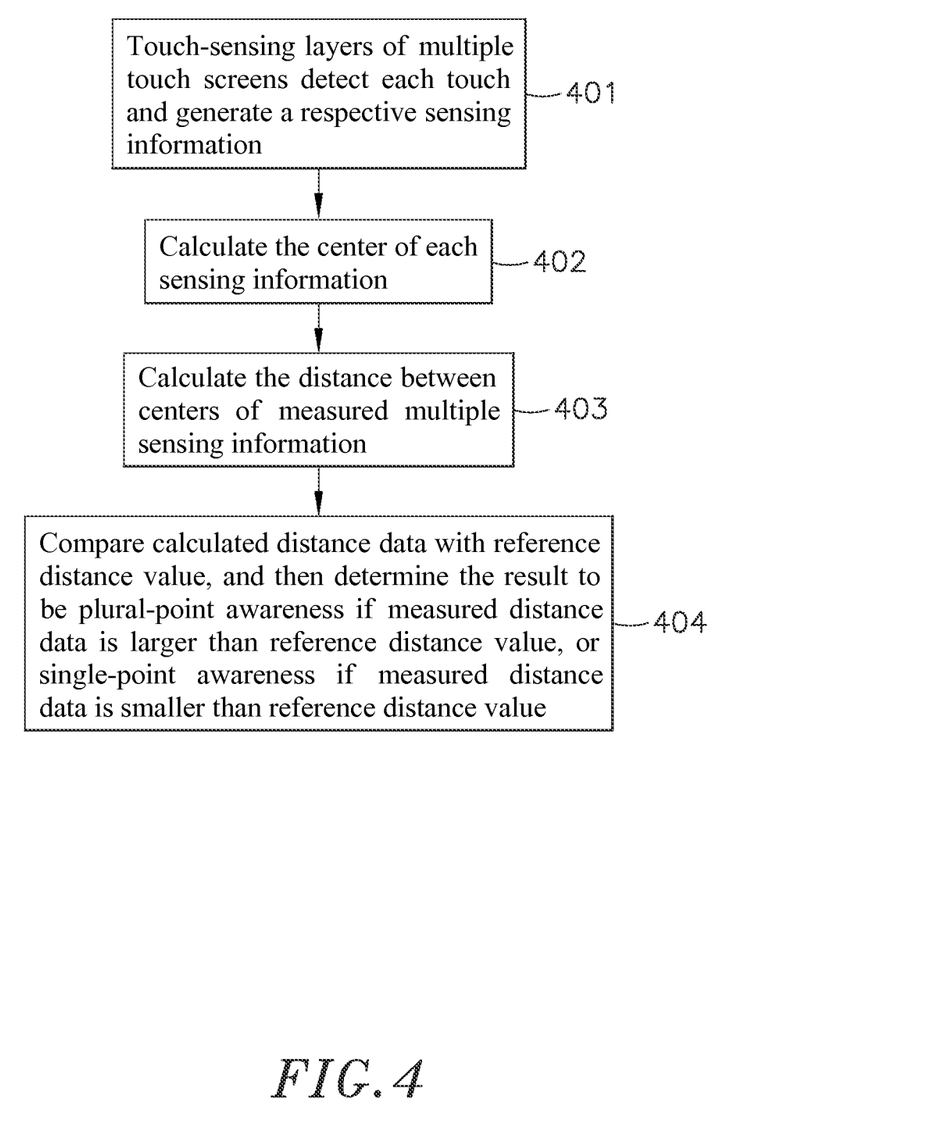
FIG. 4 is a flow chart of a junction area touch sensing method in accordance with the present invention.

Referring to FIG. 4 and FIGS. 1-3 again, multiple touch screens 1 are abutted against one another in a flush manner to form a multi-touch touch screen. When one finger 3 or multiple fingers 3 touch a junction area between two touch screens 1 or among multiple touch screens 1, the finger or fingers 3 induce a touch area 31 in each touch screen 1 being touched, causing each respective touch screen 1 to generate a respective sensing information. This junction area touch sensing operation is performed subject to the following steps:

(401) The touch-sensing layers 110 of the multiple touch screens 1 detect each touch and generate a respective sensing information.

(402) Calculate the center of each sensing information.

(403) Calculate the distance between the centers of each two measured sensing information respectively obtained from two adjacent touch screens at the same time.

(404) Compare each calculated distance data with a predetermined reference distance value, and then determine the result to be a plural-point awareness (recognition of the presence of more than one or more than two points of contact with the surface of the multi-touch touch screen) if the measured distance data is larger than the reference distance value, or single-point awareness (recognition of the presence of one point of contact with the surface of the multi-touch touch screen) if the measured distance data is smaller than the reference distance value.

In the above-described sensing operation, the step of calculating the center of each sensing information is achieved by: enabling the processor 122 to calculate the geometric center (X and Y coordinate values) of each induced touch area 31. Each sensing information provided in the above-described calculation can be a difference value or double difference value.

Figure 5:
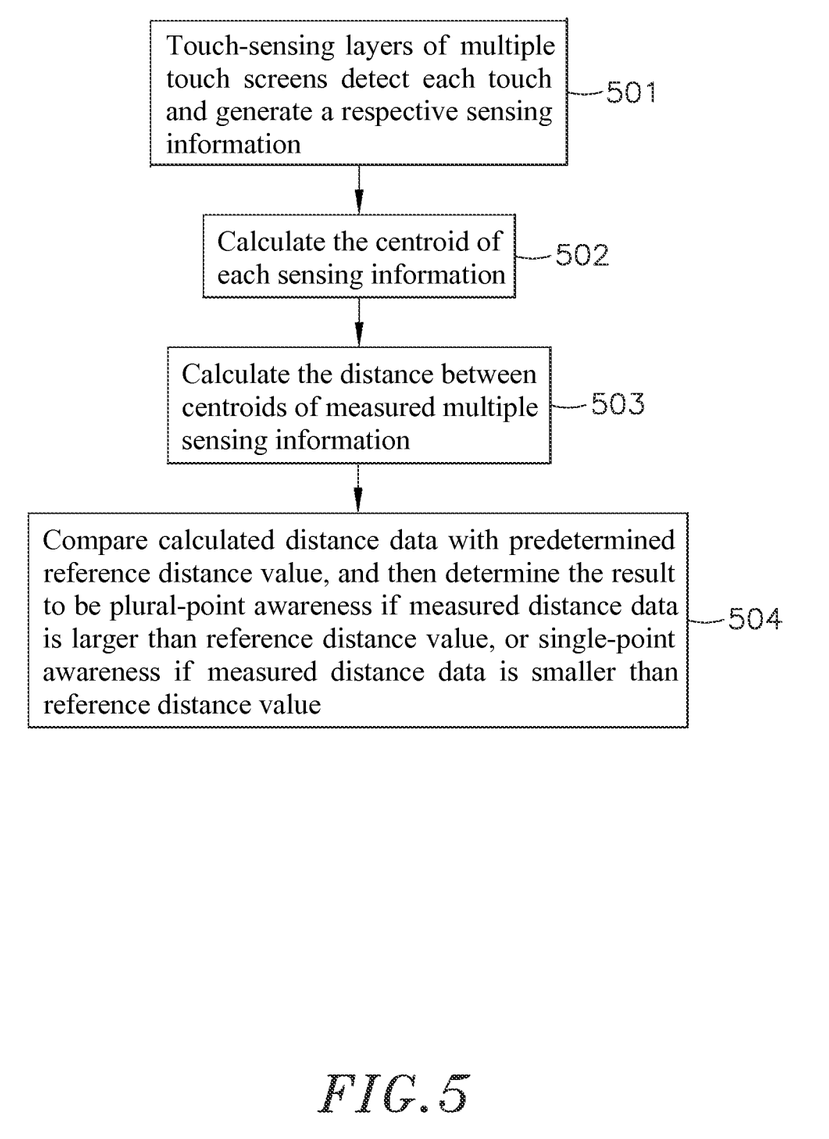
FIG. 5 is a flow chart of an alternate form of the junction area touch sensing method in accordance with the present invention.

Referring to FIG. 5 and FIGS. 1-3, in an alternate form of the present invention, the junction area touch sensing operation is performed subject to the following steps:

(501) The touch-sensing layers 110 of the multiple touch screens 1 detect each touch and generate a respective sensing information.

(502) Calculate the centroid of each sensing information.

(503) Calculate the distance between the centroids of each two measured sensing information respectively obtained from two adjacent touch screens at the same time.

(504) Compare each calculated distance data with a predetermined reference distance value, and then determine the result to be a plural-point awareness (recognition of the presence of more than one or more than two points of contact with the surface of the multi-touch touch screen) if the measured distance data is larger than the reference distance value, or single-point awareness (recognition of the presence of one point of contact with the surface of the multi-touch touch screen) if the measured distance data is smaller than the reference distance value.

In the above-described sensing operation, the step of calculating the centroid of each sensing information is to calculate the centroid (the position of center of gravity or weighted average position) of each sensing information for matching. Further, each sensing information used in the above-described calculation can be a difference value or double difference value.

Referring to FIG. 6 and FIGS. 1-3 again, each sensing information induced in the above-described sensing operation is a continuous series of signal values that can be the signal values sensed by multiple sensors 113 within a time interval, the signal values sensed by one single sensor 113 in continuous time intervals, or the signal values of different sensing points sensed by one single sensor 113 within a time interval. In the process of exhibiting each sensing information in a continuous series of signal values, every signal from each individual sensor 113 or every signal corresponding to each time interval or position can be individually converted into a respective signal value. Alternatively, the process of exhibiting each sensing information in a continuous series of signal values can be achieved by obtaining a predetermined number of sensing information or all sensing information, and then employing an analysis to obtain individual signal values. When an external object touches or approaches the touch-sensing device 11, the continuous series of signal values of the sensing information can be as illustrated in FIG. 6. However, this configuration of sensing information is simply an example but not intended for use to limit the scope of the present invention.

Further, the position analysis can be a one-dimensional position analysis to analyze a first one-dimensional centroid position of every external object in a first axis (first dimension) according to at least one one-dimensional position induced by every external object in a first axis. Similarly, the position analysis can be a one-dimensional position analysis to analyze a second one-dimensional centroid position of every external object in a second axis (second dimension) according to at least one one-dimensional position induced by every external object in a second axis. Further, by means of pairing the first one-dimensional centroid position of every external object in the first axis (first dimension) and the second one-dimensional centroid position of the same external object in the second axis (second dimension), a two-dimensional position of every external object can be analyzed.

Referring to FIGS. 7-9 and FIGS. 1-5, in an alternate form of the present invention, each sensing information induced is a continuous series of difference values, wherein every difference value is the difference between one pair of signal values; every sensing information exhibited in the form of a continuous series of difference values can be regarded as a differential sensing information. In the present invention, every differential sensing information can be obtained directly during the sensing operation. If multiple signals are obtained at the same time or one after another continuously, every difference value is generated according to the differential signal corresponding to one pair of sensors 113, one pair of time intervals or one pair of positions. Every differential sensing information can be generated according to the original sensing information of multiple signal values. As stated earlier, the invention does not limit the configuration of sensing information. A difference value can be another configuration of differential signal. To facilitate the description of the present invention, difference value is taken as an example in the following description. Any ordinary person skilled in the art can estimate the configuration of a differential signal according to the configuration of the related difference value.

Figure 7:
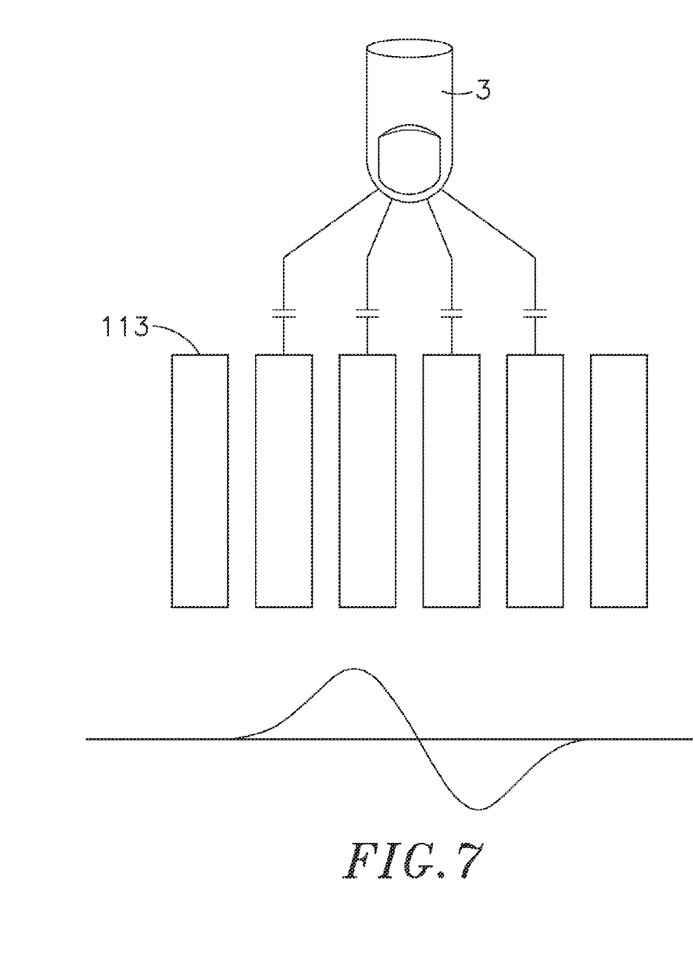
FIG. 7 is a schematic drawing illustrating the configuration of a difference value between two signal values in accordance with the present invention.

In one embodiment of the present invention, a difference value is the difference between one pair of adjacent or non-adjacent signal values, for example, the difference between one signal value and a previous signal value, or the difference between one signal value and a next signal value. In another embodiment of the present invention, a difference value can be the difference between two non-adjacent signal values. When an external object touches or approaches one touch screen 1, the continuous series of difference values of the sensing information can be as illustrated in FIG. 7. In one embodiment of the present invention, a position corresponding to every difference value is the midpoint between the positions of two signal values.

Figure 8:
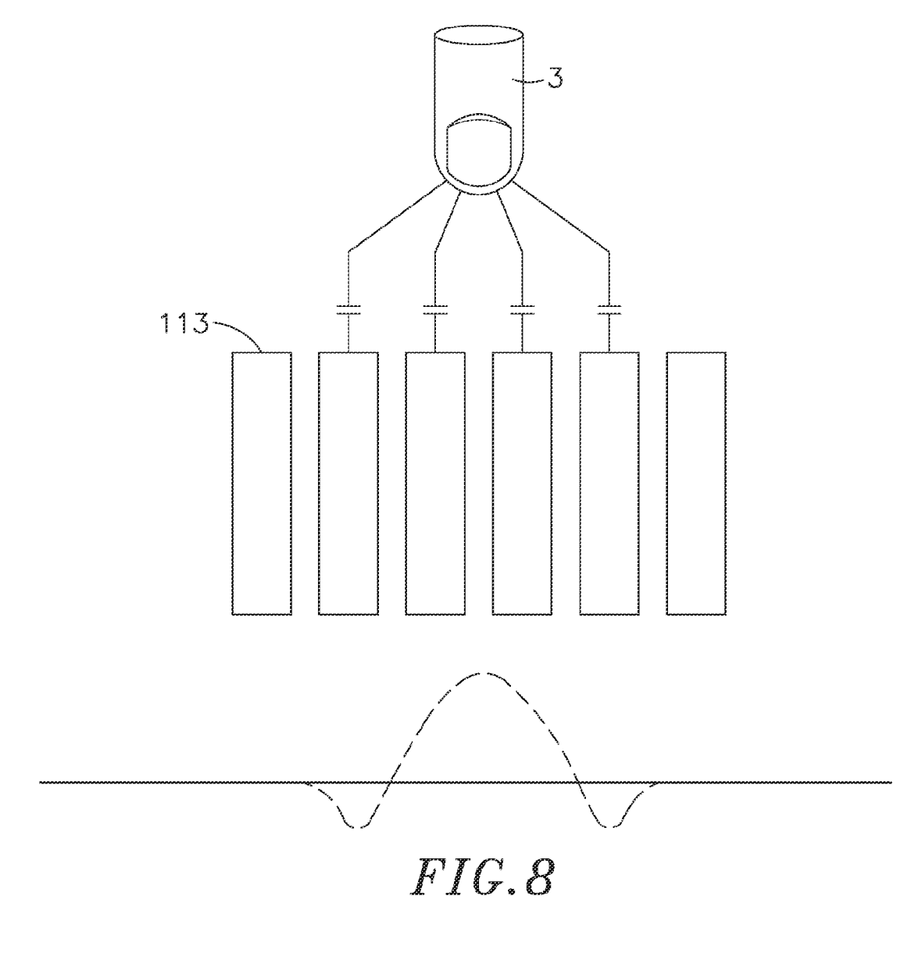
FIG. 8 is a schematic drawing illustrating the configuration of a double difference value between signal values in accordance with the present invention (I).
Figure 9:
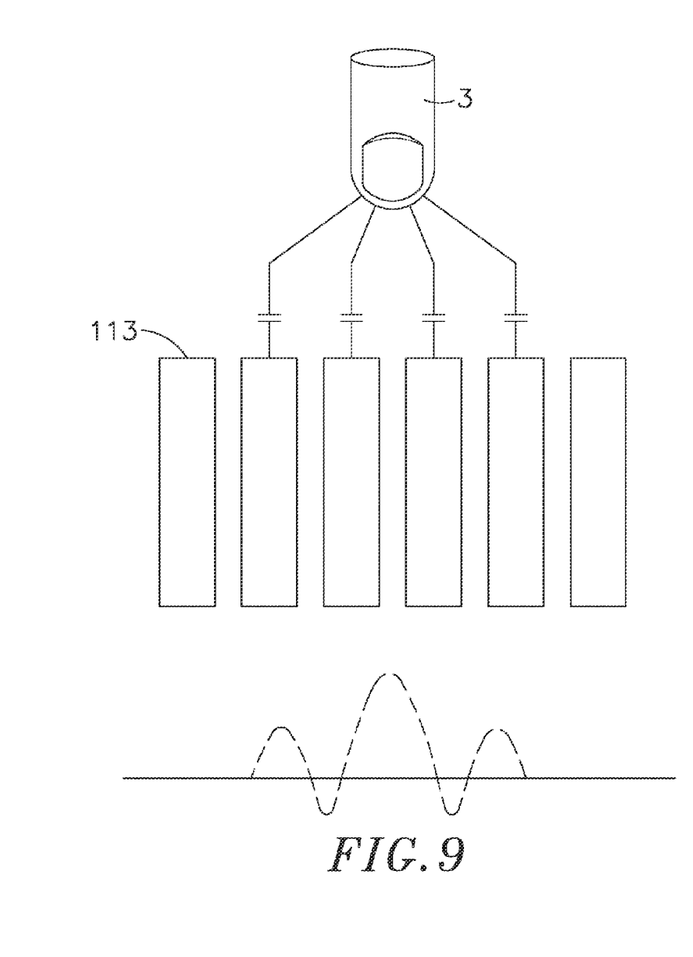
FIG. 9 is a schematic drawing illustrating the configuration of a double difference value between signal values in accordance with the present invention (II).

In one embodiment of the present invention, when an external object touches or approaches one touch screen 1, two pairs of signal values consist of three adjacent or non-adjacent signal values. In one embodiment of the present invention, the difference value between the first two signal values and the difference values between the last two signal values are respectively defined as a first difference value and a second difference value, and the double difference value is the difference between the first difference value and the second difference value, wherein the first difference value and the second difference value are the difference obtained by subtracting the previous signal value from the signal value following it. In another embodiment of the present invention, the difference value between the first two signal values and the difference values between the last two signal values are respectively defined as a first difference value and a second difference value, and the double difference value is the sum of the first difference value and the second difference value, wherein one of the first difference value and the second difference value is the difference obtained by subtracting the signal value in front from the signal value behind; the other of the first difference value and the second difference value is the difference obtained by subtracting the signal value behind from the signal value in front. For example, two pairs of signal values comprise a first signal value, a second signal value and a third signal value. The double difference value corresponding to these three signals (the value of the second signal minus the value of the first signal) plus (the value of the second signal minus the value of the third signal); (the value of the second signal minus the value of the first signal) minus (the value of the third signal minus the value of the second signal) or (the value of the first signal minus the value of the second signal) minus (the value of the second signal minus the value of the third signal). In the case that the two pairs of signal values consist of three adjacent signal values, when an external object touches or approaches one touch screen 1, the continuous double difference value of the sensing information can be as illustrated in FIG. 8. In the case that the two pairs of signal values consist of three non-adjacent signal values, when an external object touches or approaches one touch screen 1, the continuous double difference value of the sensing information can be as illustrated in FIG. 9

According to the present invention, each sensing information corresponding to one individual sensor 113, time interval or position can be the sensor's sensing signal. If the sensing signal is an analog signal, it can be converted into a digital signal value through an analog-to-digital converter. Therefore, a difference value as described above can be the difference between a pair of signals, for example, the value obtained by subtracting a pair of signals through a differential amplifier. Similarly, a double difference value can be the value obtained by subtracting each pair of signals through a respective differential amplifier to obtain a respective difference and then subtracting (or adding) the two differences thus obtained. It is to be understood that a difference value or double difference value in accordance with the present invention is not limited to the method of obtaining it from signals or signal values, i.e., it can also be obtained from the records (electrical records, magnetic records or optical records), or temporary status of signals or signal values in a hardware or software performance.

In other words, a sensing information can be a signal, differential signal (difference between two signals) or double differential signal (the sum or difference of the differences between two pairs of signals). Signal value, difference value or double difference value (signal, difference value or double difference value after converted through an analog-to-digital converter) is another existed configuration. "Signal and signal value", "differential signal and difference value" and "double differential signal and double difference value" are the representative of a sensing signal at a different stage. Further, it is to be understood that touch-related sensing information refers to a sensing information corresponding to the presence of one or multiple points of contact of an external object with the surface of the multi-touch touch screen or its approach to the surface of the multi-touch touch screen, such as original touch related sensing information, differential touch related sensing information or double differential touch related sensing information.

In an example of centroid position calculation, take i signal values before the $n^{th}$ signal value and j signal values after the $n^{th}$ signal value as a centroid computation range, and then determine the centroid position $C_{centroid}$ subject to every signal value $C_k$ and the position $X_k$ of every signal value in the centroid computation range; the computational formula is:

$$C_{centroid} = \frac{\sum_{k=n-i}^{n+j} X_k C_k}{\sum_{k=n-i}^{n+j} C_k}$$

wherein, $X_k$ can be a one-dimensional coordinate (for example, X-coordinate or Y-coordinate) or two-dimensional coordinate (for example, X and Y coordinates).

Assume the difference between the $(k-1)^{th}$ signal value and the $k^{th}$ signal value is $D_k$, and the $k^{th}$ double difference value is $DD_k = D_{k-1} - D_k = (C_k - C_{k-1}) - (C_{k+1} - C_k) = 2C_k - C_{k-1} + C_{k+1}$; when take i double difference values before the $n^{th}$ double difference value $DD_n$ and j double difference values after the $n^{th}$ double difference value $DD_n$ as a centroid computation range, determine the centroid position $DD_{centroid}$ subject to every double difference value $DD_k$ in the centroid computation range; the computational formula is:

$$DD_{centroid} = \frac{\sum_{k=n-i}^{n+j} X_k DD_k}{\sum_{k=n-i}^{n+j} DD_k}$$

wherein, $X_k$ can be a one-dimensional coordinate (for example, X-coordinate or Y-coordinate) or two-dimensional coordinate (for example, X and Y coordinates). Any ordinary person skilled in the art can infer that the calculation of the centroid position when the $k^{th}$ double difference value is $DD_k = (C_k - C_{k-2}) - (C_{k+2} - C_k) = 2C_k - C_{k-2} + C_{k+2}$.

In another embodiment of the present invention, the determination of a centroid position is performed after subtracting the signal value or double difference value from a base value. The base value can be the mean of all signal values or double difference values, the mean of the multiple signal values or double difference values before and after the signal value or double difference value for centroid position determination, or the mean of the multiple adjacent signal values or double difference values that are before and after the signal value or double difference value for centroid position determination and not to be used for centroid position determination. Any ordinary person skilled in the art can infer the determination of any other base value, for example, determining the base value according to a first ratio of at least one signal value or double difference value at one side and a second ratio of at least one signal value or double difference value at the other side.

Assume that the means of the $i^{th}$ signal value $C_{n-i}$ before the $n^{th}$ signal value and $j^{th}$ signal value after the $n^{th}$ signal value is used as the base value $$C_{base(i,j)}\left(C_{base(i,j)} = \frac{C_{n-i} + C_{n+j}}{2}\right),$$

take i signal values before the $n^{th}$ signal value and j signal values after the $n^{th}$ signal value as a centroid computation range, determine the centroid position $C_{centroid}$ using the calculation signal value $(C_k - C_{base(i,j)})$ that is obtained by subtracting the base value $C_{base(i,j)}$ from every signal value $C_k$ in the centroid computation range; the computational formula is:

$$C_{base(i,j)} = \frac{C_{n-i} + C_{n+j}}{2}$$

$$C_k - C_{base(i,j)} = \frac{2C_k - C_{n-i} - C_{n+j}}{2} = \frac{(C_k - C_{n-i})}{2} + \frac{(C_k - C_{n+j})}{2}$$

$$C_{cnetroid} = \frac{\sum_{k=n-i}^{n-i \leq k \leq n+j} X_k \left(\frac{2C_k - C_{n-i} - C_{n+j}}{2}\right)}{\sum_{k=n-i}^{n-i \leq k \leq n+j} \frac{2C_k - C_{n-i} - C_{n+j}}{2}} = \frac{\sum_{k=n-i}^{n-i \leq k \leq n+j} X_k (2C_k - C_{n-i} - C_{n+j})}{\sum_{k=n-i}^{n-i \leq k \leq n+j} (2C_k - C_{n-i} - C_{n+j})}$$

wherein, $X_k$ can be a one-dimensional coordinate (for example, X-coordinate or Y-coordinate) or two-dimensional coordinate (for example, X and Y coordinates).

Thus, the present invention provides a third position analysis to determine the position corresponding to the external object according to the centroid (the position of center of gravity or weighted average position) of multiple difference values of the sensing information.

Assume the difference between the $(k-1)^{th}$ signal value $C_{k-1}$ and the $k^{th}$ signal value $C_k$ is $D_k$.

$$(C_k - C_{n-i}) = D_{n-(i-1)} + D_{n-(i-2)} + \ldots + D_k$$

$$(C_k - C_{n+j}) = -(D_{k+1} + D_{k+2} + \ldots + D_{n+j})$$

$$C_k - C_{base(i,j)} = \frac{2C_k - C_{n-i} - C_{n+j}}{2} =$$

$$\frac{(D_{n-(i-1)} + D_{n-(i-2)} + \ldots + D_k) - (D_{k+1} + D_{k+2} + \ldots + D_{n+j})}{2}$$

$$C_k - C_{base(i,j)} = \frac{\sum_{s=n-(i-1)}^{k} D_s - \sum_{s=k+1}^{n+j} D_s}{2}$$

$$C_{cnetroid} = \frac{\sum_{s=n-i}^{n-i \leq k \leq n+j} X_s \left(\frac{\sum_{s=n-(i-1)}^{k} D_s - \sum_{s=k+1}^{n+j} D_s}{2}\right)}{\sum_{s=n-i}^{n-i \leq k \leq n+j} \frac{\sum_{s=n-(i-1)}^{k} D_s - \sum_{s=k+1}^{n+j} D_s}{2}} =$$

-continued $$\frac{\sum\limits_{s=n-i}^{n-i\leq k\leq n+j} X_k \left( \sum\limits_{s=n-(i-1)}^{k} D_s - \sum\limits_{s=k+1}^{n+j} D_s \right)}{\sum\limits_{s=n-i}^{n-i\leq k\leq n+j} \left( \sum\limits_{s=n-(i-1)}^{k} D_s - \sum\limits_{s=k+1}^{n+j} D_s \right)}$$

Thus, the centroid position $C_{centroid}$ can be obtained subject to the difference between signal values, wherein the difference value in the centroid computation range is $D_{n-(i-1)}, D_{n-(i-2)}, \ldots, D_k, D_{k+1}, \ldots, D_{n+j}, D_{n+(j+1)}$, in other words, the centroid position $C_{centroid}$ can be obtained by computing the difference value in the centroid computation range.

In the following example, one signal value before the $n^{th}$ signal value and one signal value after the $n^{th}$ signal value are taken for determining the centroid position $C_{centroid}$; the computation based on a difference value in the centroid computation range is subject to the following computational formulas:

$$D_{n-1} = C_{n-1} - C_{n-2}$$

$$D_n = C_n - C_{n-1}$$

$$D_{n+1} = C_{n+1} - C_n$$

$$D_{n+2} = C_{n+2} - C_{n+1}$$

$$C_{base(2,2)} = \frac{C_{n-2} + C_{n+2}}{2}$$

$$C_{n-1} - C_{base(2,2)} = \frac{2C_{n-1} - C_{n-2} - C_{n+2}}{2} = \frac{D_{n-1} - D_n - D_{n+1} - D_{n+2}}{2}$$

$$C_n - C_{base(2,2)} = \frac{2C_n - C_{n-2} - C_{n+2}}{2} = \frac{D_{n-1} + D_n - D_{n+1} - D_{n+2}}{2}$$

$$C_{n+1} - C_{base(2,2)} = \frac{2C_{n+1} - C_{n-2} - C_{n+2}}{2} = \frac{D_{n-1} + D_n + D_{n+1} - D_{n+2}}{2}$$

$$C_{centroid} = \frac{X_{n-1}(C_{n-1} - C_{base(2,2)}) + X_n(C_n - C_{base(2,2)}) + X_{n+1}(C_{n+1} - C_{base(2,2)})}{(C_{n-1} - C_{base(2,2)}) + (C_n - C_{base(2,2)}) + (C_{n+1} - C_{base(2,2)})}$$

$$C_{centroid} = (X_{n-1}(D_{n-1} - D_n - D_{n+1} - D_{n+2}) + X_n(D_{n-1} + D_n - D_{n+1} - D_{n+2}) + X_{n+1}(D_{n-1} + D_n + D_{n+1} - D_{n+2})) / ((D_{n-1} - D_n - D_{n+1} - D_{n+2}) + (D_{n-1} + D_n - D_{n+1} - D_{n+2}) + (D_{n-1} + D_n + D_{n+1} - D_{n+2}))$$

Any ordinary person skilled in the art can infer that the technique of taking i signal values, difference values or double difference values before the $n^{th}$ signal value, difference value of double difference value and j signal values, difference values or double difference values after the $n^{th}$ signal value as a centroid computation range for the determination of the signal value, difference value or double difference value of the centroid position, and vice versa.

Referring to FIGS. 1-5 again, a multi-touch touch screen can be formed of two touch screens 1 abutted against each other to provide one junction area therebetween. When one finger 3 touches the junction area, the finger 3 simultaneously touches the two touch screens 1. At this time, the contact of the finger 3 with the surface is cut off by the junction area, the total area of the touch area 31 is relatively reduced. Further, because the touch area 31 is also cut off by the junction area at this time, the touch area 31 located on each touch screen 1 is also relatively reduced, leading to the result that the center position or centroid position calculated subject to the sensing information is closer to the junction area relative to the center position or centroid position in the case the finger 3 touches one single touch screen 1. Therefore, when two fingers 3 respectively touch the two adjacent touch screens 1, two complete touch areas 3 are respectively induced on the two touch screens 1 by the two fingers 3. At this time, the distance between the centers or centroids of the two sensing information is relatively larger. If one single finger 3 touches the junction area between the two touch screens 1, the distance between the centers or centroids of the two sensing information is relatively smaller. Therefore, if the distance between the centers or centroids of two sensing information is larger than a predetermined reference distance value (predetermined distance), it means the presence of more than one or more than two points of contact with the surface. On the contrary, if the distance between the centers or centroids of two sensing information is smaller than the predetermined reference distance value (predetermined distance), it means the presence of one point of contact with the surface. Further, because touch screens 1 have different sizes, such as 2.5 inch, 3.5 inch, 19 inch, 32 inch, 65 inch or 82 inch, the distance of the junction area between two adjacent touch screens will be relatively changed. Further, touch screens 1 from different manufacturers, or of different models, the arrangement of the sensors 113 near the junction area can be different. Therefore, the aforesaid predetermined reference distance value (predetermined distance) must be relatively adjusted subject to the touch screens 1 used. However, this predetermined reference distance value (predetermined distance) must be larger than or equal to the gap distance of the junction area.

Further, multiple touch screens 1 can be arranged in a rectangular array (for example, 4 touch screens in a 2*2 rectangular array; 6 touch screens in a 3*2 rectangular array; 9 touch screens in a 3*3 rectangular array). At this time, each four adjacent touch screens form a junction area at the center. If one single finger 3 touches the junction area at this time, the finger simultaneously touches the four touch screens. Because the contact of the finger 3 with the surface is cut off by the junction area, and a respective touch area 31 is formed at each of the four touch screens 1, the touch area 31 formed at each touch screen 1 is relatively smaller than one complete touch area 31 formed at one touch screen 1 by one single finger 3. At this time, the distance between the centers or centroids of each two sensing information is relatively smaller than the predetermined reference distance value (predetermined distance). Thus, a touch of one single finger 3 or multiple fingers 3 can be identified.

In actual application of the multi-touch touch screen and its junction area touch sensing method of the present invention, it is to calculate the center of each sensing information and the distance between the centers of two sensing information respectively obtained from two adjacent touch screens at the same time, and then to compare the distance thus calculated with a predetermined reference distance value (predetermined distance), and then to determine that the contact is the presence of multiple fingers 3 if the calculated distance is larger the predetermined reference distance value (predetermined distance), or to determine that the contact is the presence of one single finger 3 if the calculated distance is smaller than the predetermined reference distance value (predetermined distance). Thus, if the user touches the junction area between touch screens, the contact of the user with the surface of the multi-touch touch screen can be accurately determined to be a single point of contact or two points of contact. The accurate touch sensing signal is then transmitted to the touch screen 1 or host computer 2 for further processing, preventing any error. Thus, the user can operate the multi-touch touch screen smoothly and rapidly, avoiding misjudgment or repeated touch control, enhancing use convenience, and attracting the user to buy the product.

In conclusion, the invention provides a multi-touch touch screen and its junction area touch sensing method. The multi-touch touch screen comprises a plurality of touch screens arranged in an array. Each touch screen comprises a touch-sensing device 11 and a controller 12. The touch-sensing device 11 comprises a touch-sensing layer 110. The touch-sensing layer 110 senses the presence of at least one point of contact and generates a respective sensing information. The controller computes the center of each sensing information and the distance between the centers of each two sensing information respectively obtained from two adjacent touch screens at the same time, and then compares each computed distance with a predetermined reference distance, and then determines the contact to be a multi-point of contact (multiple fingers 3) if the computed distance is larger than the predetermined reference value, or a single-point of contact (one finger 3) if the computed distance is smaller than the predetermined reference value.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A junction area touch sensing method used in a multi-touch touch screen comprising a plurality of touch screens abutted against one another, each the touch screen comprising a touch-sensing device and a controller electrically coupled with the touch-sensing device, the touch-sensing device comprising a touch-sensing layer, the junction area touch sensing method comprising the steps of:
   (i) the touch-sensing layers of multiple the touch screens detecting each touch and generating a respective sensing information;
   (ii) the controller calculating the center of each the sensing information;
   (iii) calculating the distance between the centers of each two measured sensing information respectively obtained from two adjacent touch screens at the same time;
   (iv) comparing each calculated distance with a predetermined reference distance value, wherein the predetermined reference distance value is larger than or equal to the gap distance of the junction area between the adjacent two touch screens, and then determining the contact to be a multi-point of contact if the measured distance is larger than the reference distance value, or single-point of contact if the measured distance data is smaller than the reference distance value.

2. The junction area touch sensing method as claimed in claim 1, wherein each the sensing information is a signal value, a difference between signal values, or a double difference between signal values.

3. The junction area touch sensing method as claimed in claim 1, wherein the center of each the sensing information is the geometric center of the associating touch area.

4. The junction area touch sensing method as claimed in claim 1, wherein the center of each the sensing information is the center point (the value of the center position).

5. A junction area touch sensing method used in a multi-touch touch screen comprising a plurality of touch screens abutted against one another, each the touch screen comprising a touch-sensing device and a controller electrically coupled with the touch-sensing device, the touch-sensing device comprising a touch-sensing layer, the junction area touch sensing method comprising the steps of:
   (i) the touch-sensing layers of multiple the touch screens detecting each touch and generating a respective sensing information;
   (ii) the controller calculating the centroid of each the sensing information;
   (iii) calculating the distance between the centroids of each two measured sensing information respectively obtained from two adjacent touch screens at the same time;
   (iv) comparing each calculated distance with a predetermined reference distance value, wherein the predetermined reference distance value is larger than or equal to the gap distance of the junction area between the adjacent two touch screens, and then determining the contact to be a multi-point of contact if the measured distance is larger than the reference distance value, or single-point of contact if the measured distance data is smaller than the reference distance value.

6. The junction area touch sensing method as claimed in claim 5, wherein each the sensing information is a signal value, a difference between signal values, or a double difference between signal values.

7. The junction area touch sensing method as claimed in claim 5, wherein the centroid of each the sensing information is the center of gravity of the associating touch area.

8. The junction area touch sensing method as claimed in claim 5, wherein the centroid of each the sensing information is the weighted average position.

9. A multi-touch touch screen, comprising a plurality of touch screens arranged in an array, each the touch screen comprising a touch-sensing device and a controller electrically coupled with the touch-sensing device, the touch-sensing device comprising a touch-sensing layer adapted for sensing the presence of at least one point of contact of at least one external object with the surface thereof, the controller being adapted for computing the center of each the sensing information and the distance between the centers of each two the sensing information respectively obtained from two adjacent touch screens at the same time, and then comparing each computed distance with a predetermined reference distance, wherein the predetermined reference distance value is larger than or equal to the gap distance of the junction area, and then determining the contact to be a multi-point of contact if the computed distance is larger than the predetermined reference value, or a single-point of contact if the computed distance is smaller than the predetermined reference value.

10. The multi-touch touch screen as claimed in claim 9, wherein each the sensing information is a signal value, a difference between signal values, or a double difference between signal values.

11. The junction area touch sensing method as claimed in claim 9, wherein the center of each the sensing information is the geometric center of the associating touch area.

12. The junction area touch sensing method as claimed in claim 9, wherein the center of each the sensing information is the center point (the value of the center position).

13. A multi-touch touch screen, comprising a plurality of touch screens arranged in an array, each the touch screen comprising a touch-sensing device and a controller electrically coupled with the touch-sensing device, the touch-sensing device comprising a touch-sensing layer adapted for sensing the presence of at least one point of contact of at least one external object with the surface thereof, the controller being adapted for computing the centroid of each the sensing information and the distance between the centroids of each two the sensing information respectively obtained from two adjacent touch screens at the same time, and then comparing each computed distance with a predetermined reference distance, wherein the predetermined reference distance value is larger than or equal to the gap distance of the junction area, and then determining the contact to be a multi-point of contact if the computed distance is larger than the predetermined reference value, or a single-point of contact if the computed distance is smaller than the predetermined reference value.

14. The multi-touch touch screen as claimed in claim 13, wherein each the sensing information is a signal value, a difference between signal values, or a double difference between signal values.

15. The junction area touch sensing method as claimed in claim 13, wherein the centroid of each the sensing information is the center of gravity of the associating touch area.

16. The junction area touch sensing method as claimed in claim 13, wherein the centroid of each the sensing information is the weighted average position.

* * * * *